United States Patent
Watanabe et al.

(10) Patent No.: US 7,237,195 B2
(45) Date of Patent: Jun. 26, 2007

(54) NOTIFICATION METHOD AND NOTIFICATION DEVICE

(75) Inventors: Satoru Watanabe, Kawasaki (JP); Masatomo Yasaki, Kawasaki (JP); Kazuki Matsui, Kawasaki (JP); Toshiaki Gomi, Kawasaki (JP); Hideto Kihara, Kawasaki (JP); Youji Kohda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 721 days.

(21) Appl. No.: 10/439,171

(22) Filed: May 16, 2003

(65) Prior Publication Data
US 2003/0225862 A1 Dec. 4, 2003

(30) Foreign Application Priority Data
May 31, 2002 (JP) ............................. 2002-159471

(51) Int. Cl.
*G06F 17/00* (2006.01)
(52) U.S. Cl. ..................... 715/705; 715/714; 715/758
(58) Field of Classification Search ........ 715/705–715, 715/739, 748, 752, 755, 758, 759
See application file for complete search history.

(56) References Cited

U.S. PATENT DOCUMENTS

| | | | | |
|---|---|---|---|---|
| 6,026,148 A * | 2/2000 | Dworkin et al. ......... | 379/88.18 |
| 6,028,601 A * | 2/2000 | Machiraju et al. ......... | 715/705 |
| 6,131,085 A * | 10/2000 | Rossides ....................... | 705/1 |
| 6,240,420 B1 * | 5/2001 | Lee ............................ | 707/102 |
| 6,393,423 B1 * | 5/2002 | Goedken ..................... | 707/10 |
| 6,959,417 B2 * | 10/2005 | Gupta ........................ | 715/513 |
| 6,988,138 B1 * | 1/2006 | Alcorn et al. ................ | 709/225 |
| 2002/0028211 A1 * | 3/2002 | Kaempfer et al. ........ | 424/190.1 |
| 2002/0065845 A1 * | 5/2002 | Naito et al. .............. | 707/500.1 |
| 2002/0133494 A1 * | 9/2002 | Goedken ..................... | 707/10 |
| 2003/0097408 A1 * | 5/2003 | Kageyama et al. .......... | 709/205 |
| 2003/0163356 A1 * | 8/2003 | Marks et al. .................. | 705/7 |
| 2004/0088182 A1 * | 5/2004 | Alter et al. .................... | 705/1 |

FOREIGN PATENT DOCUMENTS

| | | |
|---|---|---|
| JP | 2001-273432 | 10/2001 |
| JP | 2001-338100 | 12/2001 |
| JP | 2001-357064 | 12/2001 |

OTHER PUBLICATIONS

Japanese Patent Office Action dated Dec. 20, 2005.
English language translation of Japanese Office Action, dated Sep. 5, 2006 previously submitted.

* cited by examiner

Primary Examiner—Tadesse Hailu
(74) Attorney, Agent, or Firm—Staas & Halsey LLP

(57) ABSTRACT

Information is quickly offered to users who require the information. In a system in which questions and answers are exchanged, when a given user other than the questioner becomes interested in a question, the user requests a notification server 1 to present the question. The answers to the question are automatically sent to a notification client 2 of the user. The answers to be sent may be either all the answers to the question or only the effective answers. Supports to the answers and comments on the answers may be accepted to decide the effectiveness of the answers.

14 Claims, 19 Drawing Sheets

| question ID |
| --- |
| collective user profile |

*Fig. 3*

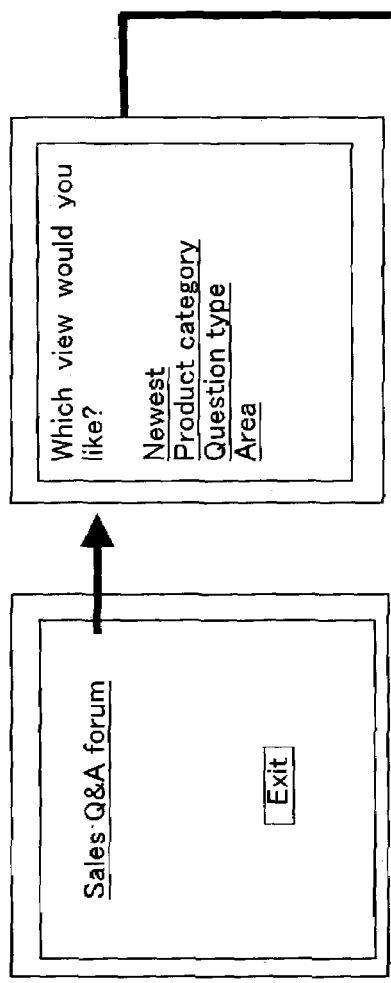
Fig. 5A
Fig. 5B
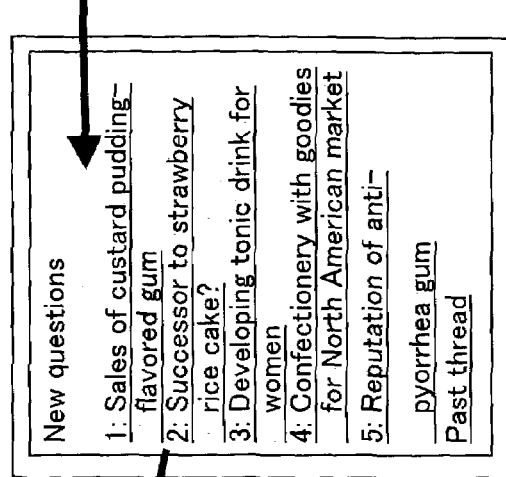
Fig. 5C
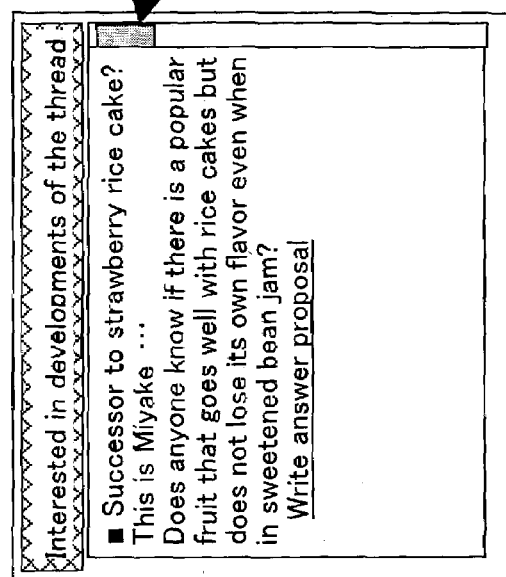
Fig. 5D
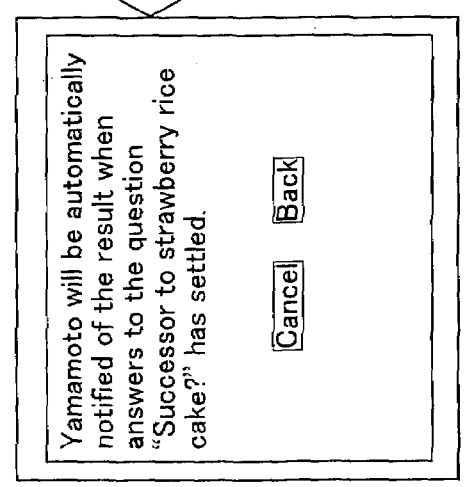
Fig. 5E

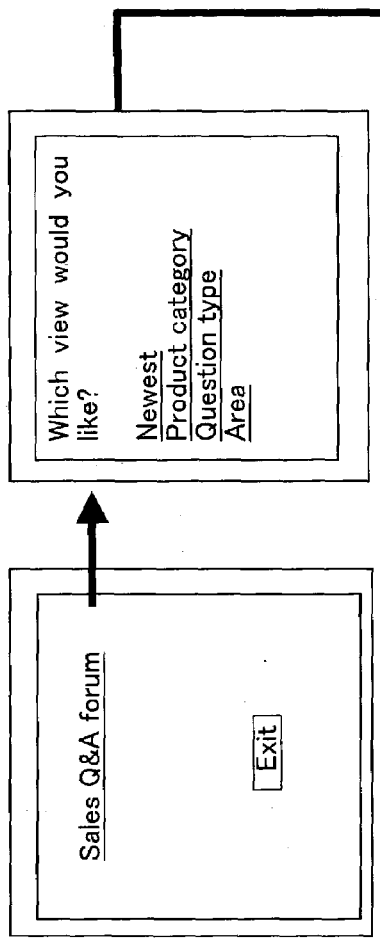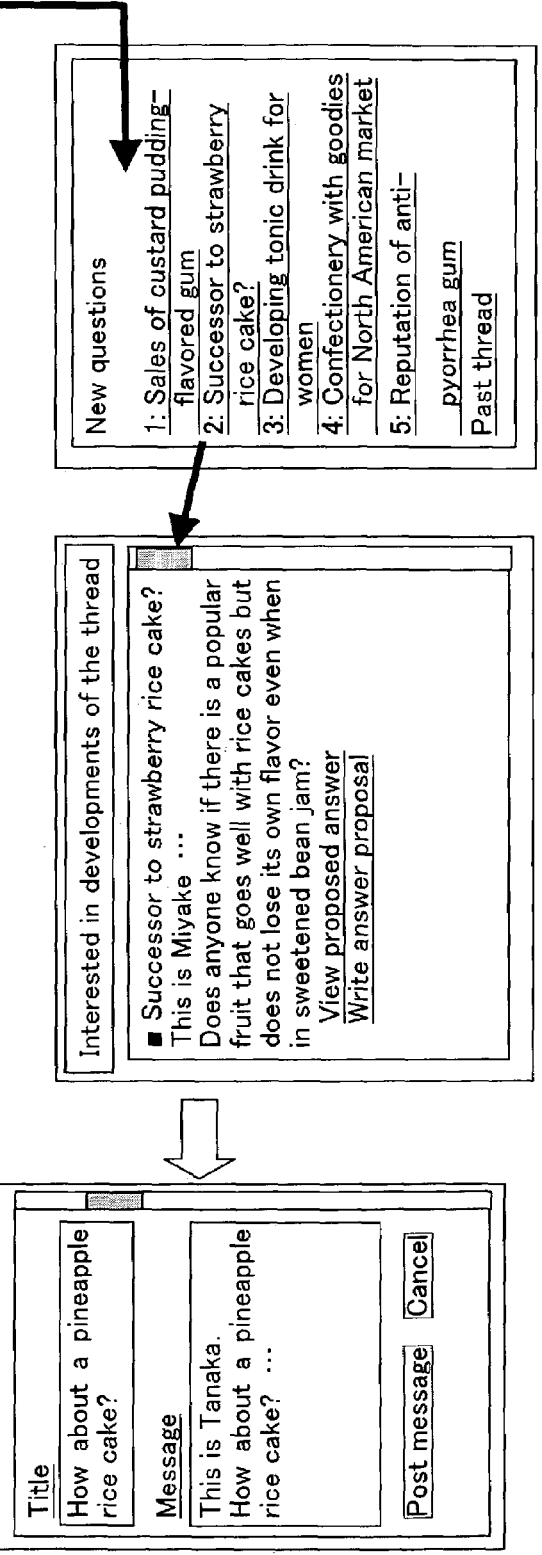

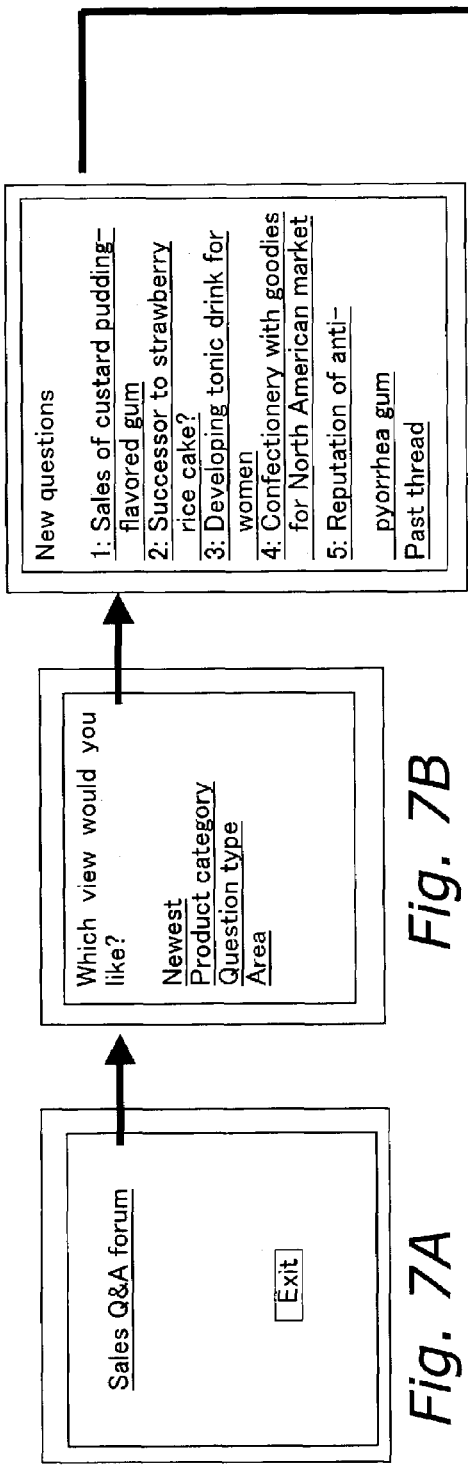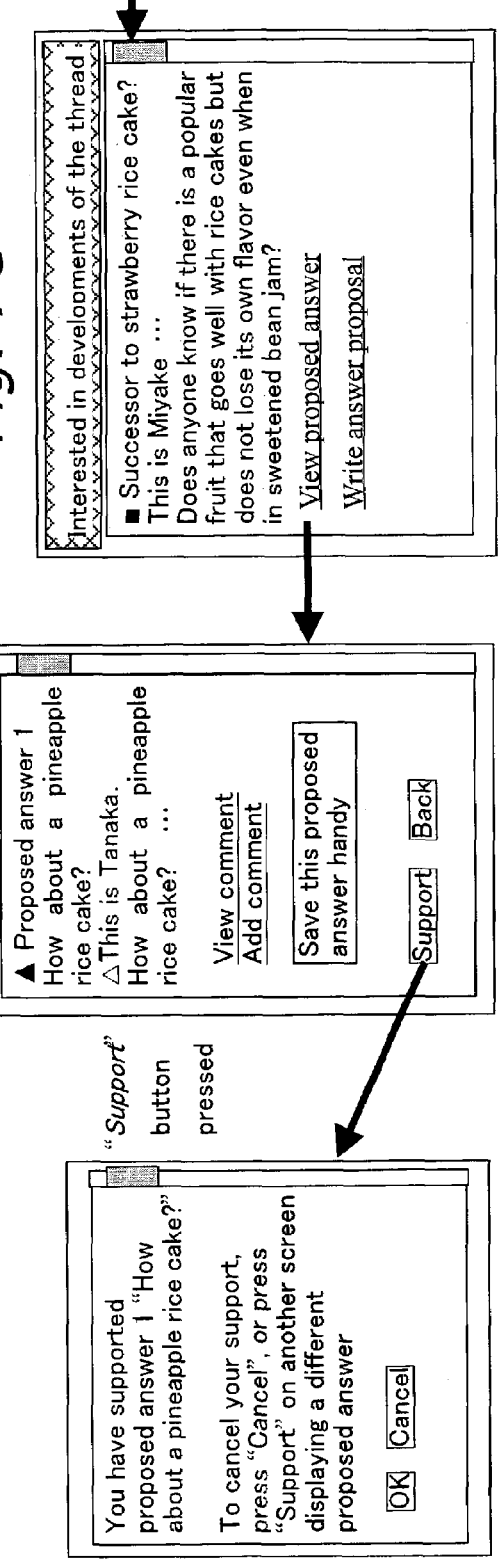

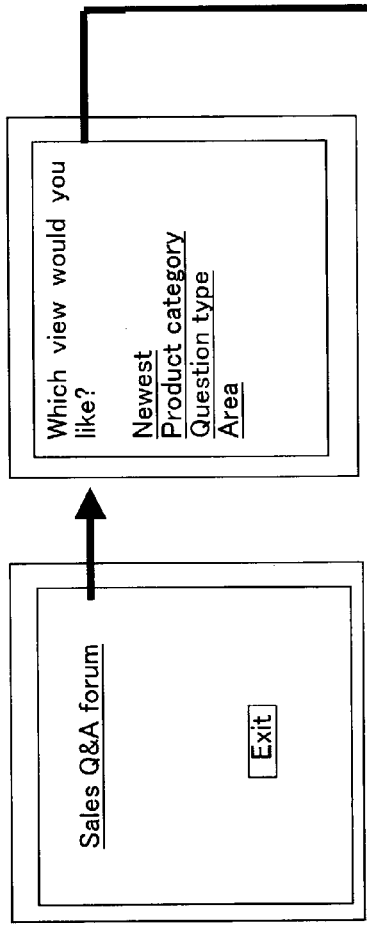
Fig. 8A
Fig. 8B
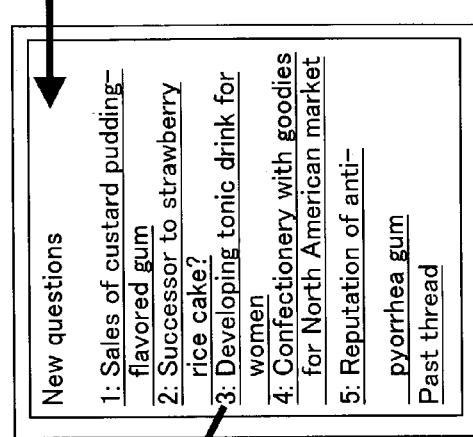
Fig. 8C
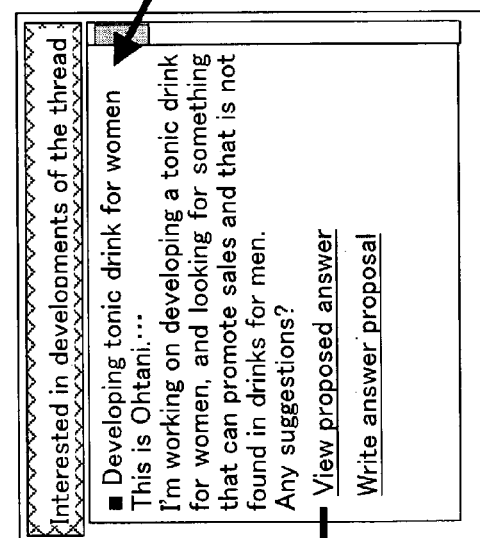
Fig. 8D

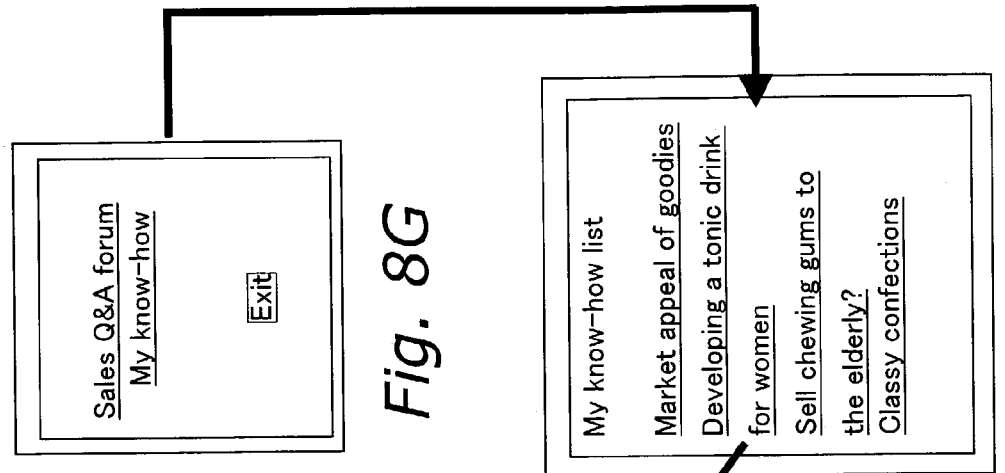
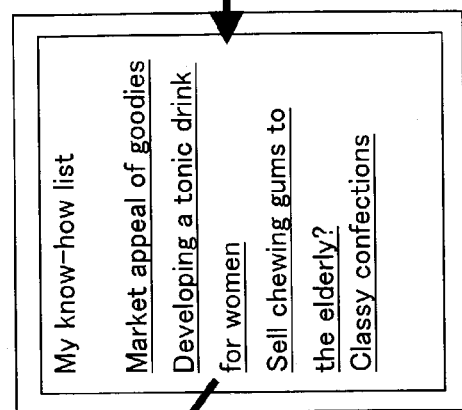
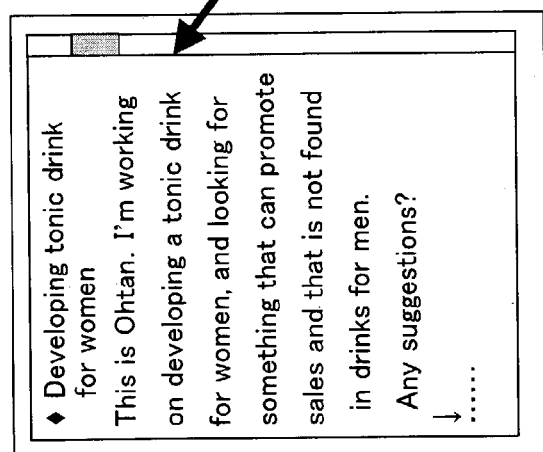
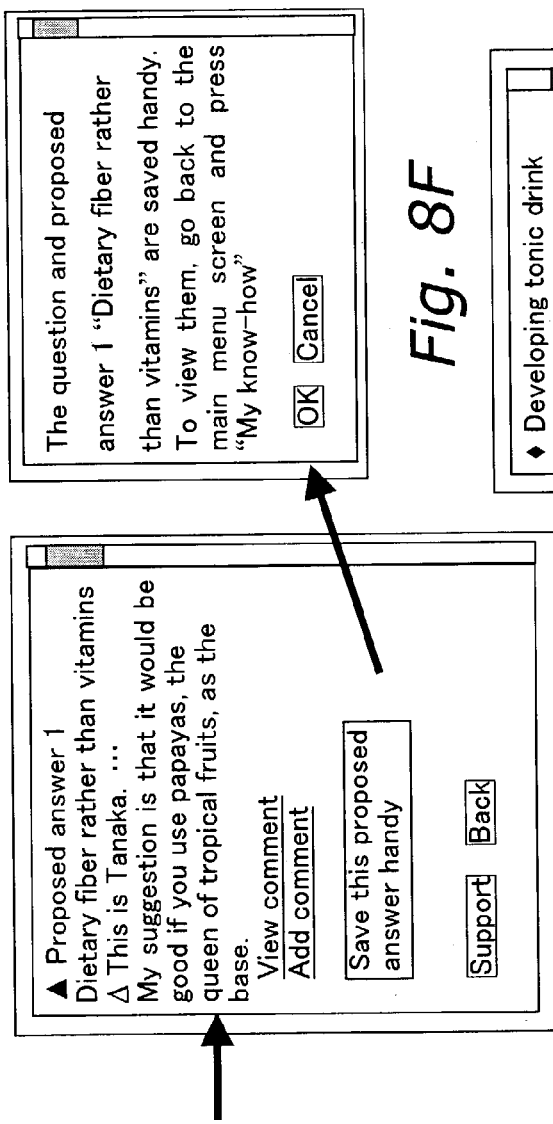
Fig. 8G
Fig. 8H
Fig. 8F
Fig. 8I
Fig. 8E

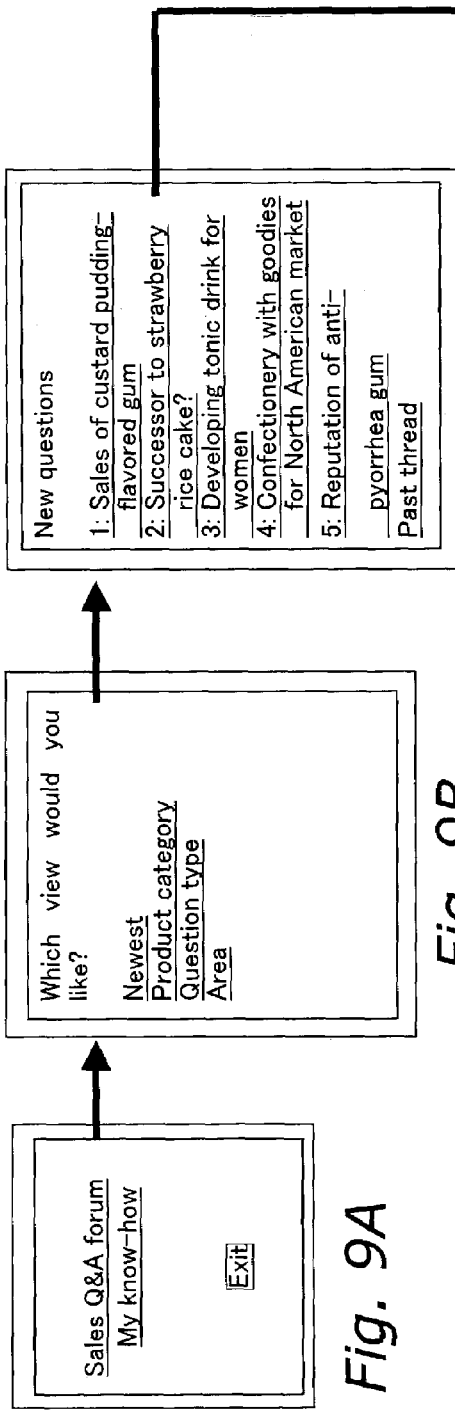

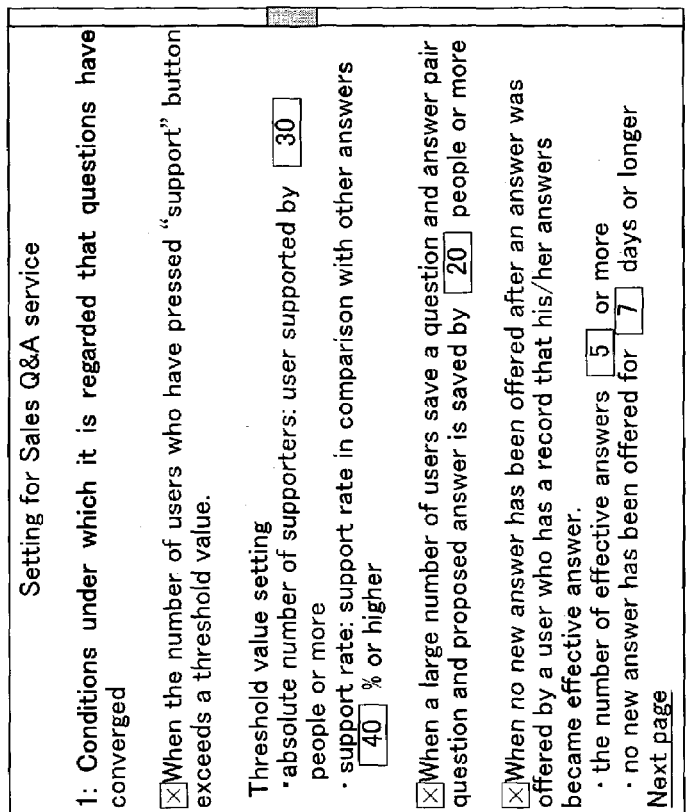
Fig. 11C
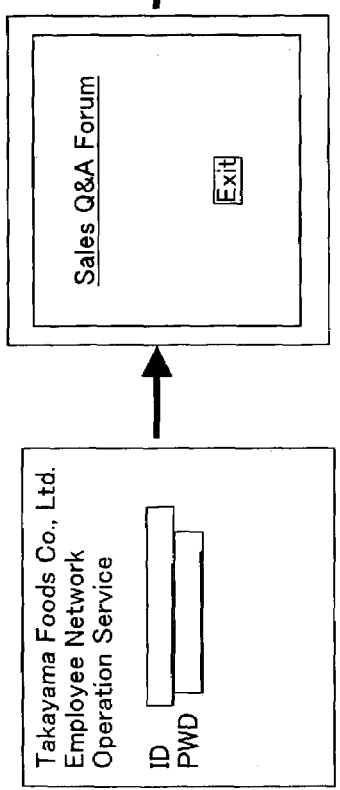
Fig. 11A
Fig. 11B
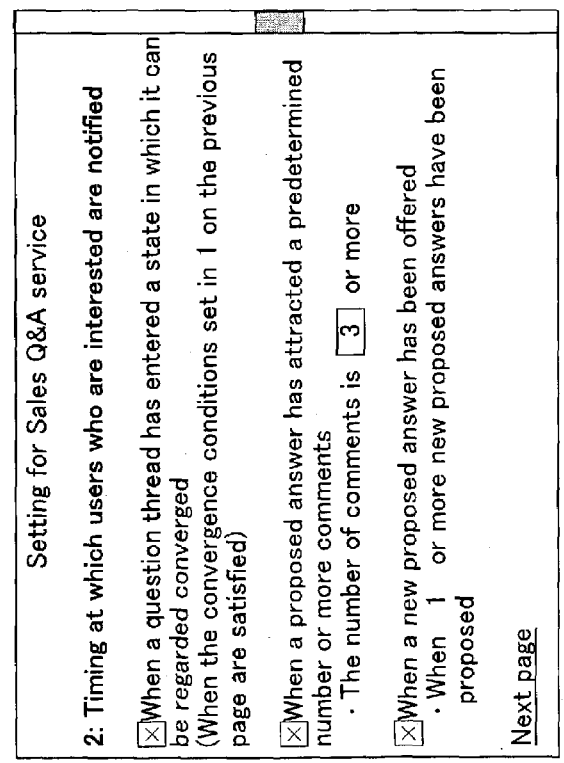
Fig. 11D

Sales Q&A Service Setting

3: Timing when to notify service center

[X] Effective answers do not satisfy the convergence conditions even when a predetermined time has elapsed since a question thread is started.

Time limit setting
• [7] days after question thread is started

[X] Answers tend to diverge due to an excessive number of proposed answers
• The number of proposed answers exceeds [4]

Takayama Foods Co., Ltd.
Employee Network
Operation Service

ID
PWD

Fig. 13B

Sales Q&A Forum

Answers to the question "Confection with goodies for North American market" do not converge Exit

Fig. 13C

The question below was posted 7 days ago. There are 8 users who are interested in the question. Neither effective answers nor proposed answers have yet been offered.

■ Confection with goodies for North American market
2002/04/28
This is Takeda. I'm working on developing a confection with goodies for the US market. Could you give me advice on the following two questions. Q1...., Q2....

Write answer proposal

Takayama Foods Co., Ltd.
Employee Network
Operation Service

ID
PWD

*Fig. 14A*

Sales Q&A Forum

Answers to the
question "Successor to
strawberry rice cake?"
tend to diverge

Exit

*Fig. 14B*

4 answers have been offered to the question below, but no effective answer has yet been offered.

■What's next to strawberry rice cake?
2002/03/18
This is Miyake. …
Does anyone know if there is a popular fruit that goes well with rice cakes but does not lose its own flavor even when in sweetened bean jam?
▲ Proposed answer 1
How about a pineapple rice cake?
△This is Tanaka at the Himeji sales promotion section.
How about a pineapple rice cake? Pineapple, with its sourness and crispy texture, would make a superb match with sweet beam jam.

▲ Proposed answer 2
Pumpkin should go well
△Sweetened bean jam and pumpkin should go well together.
Pumpkin will produce a beautiful color. …

▲Proposed answer 3
How about acerola cherry?
△I'm Nakayama. The sweetness and sourness of strawberry reminds me of acerola cherry. …

◀Proposed answer 1
How about a sour persimmon rice cake?
△I'm Kitano. We tentatively shipped out a persimmon shortcake as a substitute for strawberry shortcakes last winter, and it was quite successful for a while. …

View current state of support to answers

*Fig. 14C*

NOTIFICATION METHOD AND NOTIFICATION DEVICE

BACKGROUND OF THE INVENTION

1. Field of the Invention

The present invention relates to technologies by which questions and answers are exchanged between a plurality of users on a network.

2. Description of the Related Art

In recent years, mobile devices such as PDAs (Personal Digital (Data) Assistants) and mobile telephones have become increasingly popular in addition to desktop-type personal computers and notebook-type personal computers, and information sharing and exchanging systems that utilizes broadband connection or nailed-up connection to networks have become feasible. A bulletin board system is one of those systems which is expected to be a means to share knowledge to solve particular problems among company employees on intranets or consumers on the Internet by collecting their voices quickly. Here, the bulletin board system means a system in which questions and the answers thereto posted from users on a network are published through an electronic bulletin board to enable the users to exchange text-based questions and answers between the users.

With the bulletin board system, however, it is unclear how important a question posted by a user A is for other users who participate in the bulletin board; moreover, it is uncertain what effect the answers to the question will have on the other users, or how or by whom the answers are made use of. For these reasons, those users who truly need information are often unable to access the Q&As that may meet their needs, and thus it is difficult to effectively share knowledge among them.

Accordingly, it is an object of the present invention to provide a technology to offer required information to the users who has a need for the information. It is another object of the present invention to provide a technology to enable the users who has a need for required information to obtain the information quickly.

BRIEF SUMMARY OF THE INVENTION

The foregoing and other objects are accomplished in accordance with a first aspect of the present invention by providing a method of notification by which questions and answers are exchanged between users, comprising: a question-processing step of receiving registration of a question from a questioner who is included among the users, and publishing the registered question; an answer-processing step of receiving registration of one or more answers to the question from one or more respondents who are included among the users, and publishing the registered answer(s); a designation-receiving step of receiving, from one or more referring users who are included among the users but are not the respondent(s), designation of a question that is among the published question(s) and that the referring user(s) has interest in; and an answer notification step of notifying the referring user(s) of the one or more answers to the designated question.

The referring users are, for example, those who have a similar question to that is raised by the questioner and who are interested in the question and the answers thereto. By automatically notifying such users of the answers to the question, it is possible to quickly provide information necessary for the users. In other words, it is possible for the users to acquire necessary information more quickly. Moreover, it is possible to promote sharing knowledge between the users.

Preferably, in the answer-processing step, a support to one of the answers is received from a user who is not one of the respondents.

For example, it is preferable if the answers that have earned high approval rates or the answers that are supported by many users are sent to the referring users, as the referring users can thereby be notified of useful answers.

Preferably, the answer-processing step further comprises: a sub-step of receiving a saving request for the question and the answer(s) to the question from the referring user(s), and saving an association of the question, the answer(s), and the referring user(s); and a sub-step of offering the saved question and answer in response to a request from the referring user(s).

The referring user(s) can save the questions and answers that they want to store as their own know-how so that they can refer to the questions and answers as needed.

Preferably, the answer-processing step further comprises a sub-step of receiving registration of a comment/comments from a user/users, and publishing the registered comment(s).

A comment is a message for adding remarks to an answer or for correcting the answer. A viewer of the answer can obtain information that he/she has interest in, in addition to the answer, by viewing comments.

Preferably, in the answer notification step, effectiveness of the answer(s) to the question is determined and the referring user(s) is/are notified of an answer/answers having high effectiveness.

For example, supports to an answer may be received and the degree of effectiveness can be determined based on the approval rate or the number of supports. In addition, comments on an answer may be received, and if the number of comments is large, it can be determined that it is an effective answer.

Preferably, in the answer notification step, it is decided whether an answer notification condition, which is a condition for notifying the referring user(s) of the answer(s), is satisfied or not, and the answer(s) is/are sent to the referring user(s) according to the result of the decision.

Examples of the answer notification condition include 1) when answers have converged, 2) when the number of comments on the answer is large, and 3) when a new answer is registered. Here, an example of the case in which answers have converged is when an effective answer is offered.

Preferably, the above-described method further comprises a personal information-storing step of storing personal information of the users; wherein, in the answer notification step, personal information of some of the users is extracted from the stored personal information based on personal information of the referring user(s), and the owner(s) of the extracted personal information is/are notified of the answer(s).

A user who has personal information similar to that of the referring user of a certain question is regarded as having interest in the question and answers thereto likewise. For this reason, such a user is inferred based on the stored personal information to notify him/her of the question and the answers thereto. Thus, it is possible to further promote sharing knowledge.

Preferably, the above-described method further comprises an assisting step of deciding whether or not an answer assistance condition, which is for determining when the answer(s) cannot be sent to the referring user(s), is satisfied, and outputting an answer assistance request according to the result of the decision.

When this notification method is executed on a computer, a screen requesting intervention from an administrator or the like is output. Conceivable examples of the answer assistance condition include 1) when answers do not converge even when a certain amount of time has elapsed after a question was posted, and 2) when too many answers are offered.

Preferably, the above-described method may further comprise a notification condition-setting step of receiving a setting of an answer notification condition, which is for determining when to notify the referring user(s) of the answer(s).

Examples of the answer notification condition include 1) when answers have converged, 2) when the number of comments on the answer is large, and 3) when a new answer has been registered.

Preferably, the above-described method may further comprise a convergence condition-setting step of receiving a setting of an answer convergence condition, which is for determining whether answers to the question have converged.

Examples of the answer convergence condition include 1) when the approval rate of a certain answer has exceeded a predetermined rate, 2) when the number of savers of the question and an answer thereto exceeded a predetermined number, and 3) when no new answer has been offered after some effective answers were obtained.

Preferably, the above-described method may further comprise an assistance condition-setting step of receiving a setting of an answer assistance condition, which is for determining when the answer(s) cannot be sent to the referring user(s).

Examples of the answer assistance condition include 1) when answers do not converge even when a certain amount of time has elapsed after the question was posted, and 2) when too many answers have been offered.

The invention also provides a computer-readable storage medium storing a notification program for exchanging questions and answers between users and for executing: a question-processing step of receiving registration of a question from a questioner who is included among the users, and publishing the registered question; an answer-processing step of receiving registration of one or more answers to the question from one or more respondents who are included among the users, and publishing the registered answer(s); a designation-receiving step of receiving, from one or more referring users who are included among the users but are not the respondent(s), designation of a question that is among the published question(s) and that the referring user(s) has interest in; and an answer notification step of notifying the referring user(s) of the one or more answers to the designated question.

Examples of the storage medium include computer-readable flexible disks, harddisks, semiconductor memories, CD-ROMs, DVDs, magneto-optical disks (MOs), and the like.

The invention also provides a notification device for exchanging questions and answers between users, comprising: a question-processing means for receiving registration of a question from a questioner who is included among the users, and publishing the registered question; an answer processing means for receiving registration of one or more answers to the question from one or more respondents who are included among the users, and publishing the registered answer(s); a designation-receiving means for receiving, from one or more referring users who are included among the users but are not the respondent(s), designation of a question that is among the published question(s) and that the referring user(s) has interest in; and an answer notification means for notifying the referring user(s) of the one or more answers to the designated question.

This device may be, for example, a computer that executes the method according to the first aspect of the invention.

The invention further provides a notification program for exchanging questions and answers between users and for working a computer function as: a question-processing means for receiving registration of a question from a questioner who is included among the users, and publishing the registered question; an answer processing means for receiving registration of one or more answers to the question from one or more respondents who are included among the users, and publishing the registered answer(s); a designation-receiving means for receiving, from one or more referring users who are included among the users but are not the respondent(s), designation of a question that is among the published question(s) and that the referring user(s) has interest in; and an answer notification means for notifying the referring user(s) of the one or more answers to the designated question.

Accordingly, the present invention makes it possible to offer information quickly to the users who need the information.

BRIEF DESCRIPTION OF THE DRAWINGS

FIG. 3 illustrates the concept of information stored in a collective user profile database;

FIG. 5A shows an example of a main menu screen provided by a notification server;

FIG. 5B shows an example of a Q & A top page screen provided by a notification server;

FIG. 5C shows an example of a question list screen provided by a notification server;

FIG. 5D shows an example of a question detail screen provided by a notification server;

FIG. 5E shows an example of a result notification confirmation screen provided by a notification server;

FIG. 6A shows an example of a main menu screen provided by the notification server;

FIG. 6B shows an example of a Q & A top page screen provided by the notification server;

FIG. 6C shows an example of a question list screen provided by the notification server;

FIG. 6D shows an example of a question detail screen provided by the notification server;

FIG. 6E shows an example of an example of a screen for answer preparation provided by the notification server;

FIG. 7A shows an example of a main menu screen provided by the notification server;

FIG. 7B shows an example of a Q & A top page screen provided by the notification server;

FIG. 7C shows an example of a question list screen provided by the notification server;

FIG. 7D shows an example of a question detail screen provided by the notification server;

FIG. 7E shows an example of a proposed answer display screen provided by the notification server;

FIG. 7F shows an example of a confirmation screen provided by the notification server;

FIG. 8A shows an example of a main menu screen provided by the notification server;

FIG. 8B shows an example of a Q & A top page screen provided by the notification server;

FIG. 8C shows an example of a question list screen provided by the notification server;

FIG. 8D shows an example of a question detail screen provided by the notification server;

FIG. 8E shows an example of a proposed answer display screen provided by the notification server;

FIG. 8F shows an example of a save confirmation screen provided by the notification server;

FIG. 8G shows an example of a main menu screen provided by the notification server;

FIG. 8H shows an example of a list screen provided by the notification server;

FIG. 8I shows an example of a detailed know-how screen provided by the notification server;

FIG. 9A shows an example of a main menu screen provided by the notification server;

FIG. 9B shows an example a Q & A top page screen provided by the notification server;

FIG. 9C shows an example a question list screen provided by the notification server;

FIG. 9D shows an example a question detail screen provided by the notification server;

FIG. 9E shows an example a proposed answer display screen provided by the notification server;

FIG. 11A shows an example of an administrative initial screen displayed by the notification server;

FIG. 11B shows an example of an administrative main menu screen displayed by the notification server;

FIG. 11C shows an example of a convergence condition-setting screen displayed by the notification server;

FIG. 11D shows an example of a notification condition-setting screen displayed by the notification server;

FIG. 12 shows an example of a screen (assistance condition-setting screen) displayed by the notification server;

FIG. 13A shows an example of an administrative initial screen displayed by the notification server;

FIG. 13B shows an example of an administrative main menu screen displayed by the notification server;

FIG. 13C shows an example of a detailed notification screen (in the case where there is no answer) displayed by the notification server;

FIG. 14A shows an example of an administrative initial screen displayed by the notification server;

FIG. 14B shows an example of an administrative main menu screen displayed by the notification server;

FIG. 14C shows an example of a detailed notification screen (in the case where answers are provided) displayed by the notification server;

DETAILED DESCRIPTION OF THE PREFERRED EMBODIMENTS

First Embodiment

1 Outline

Figure 1:
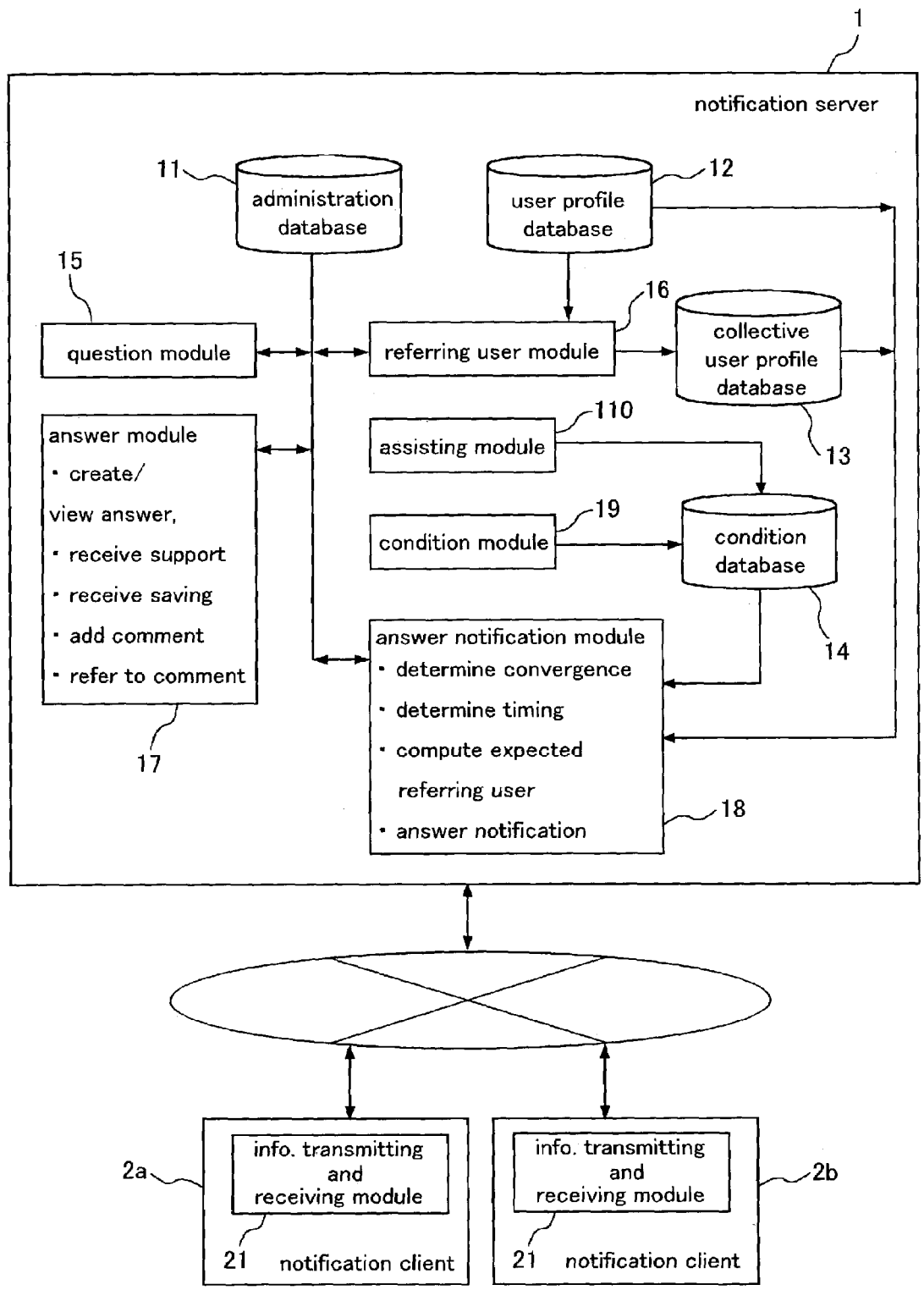
FIG. 1 shows an overall configuration of a notification system according to a first embodiment.

FIG. 1 shows the overall configuration of a notification system according to a first embodiment of the present invention. The notification system includes a notification server 1 and notification clients 2a, 2b, . . . (hereafter referred to as "notification client 2"). The notification server 1 and the notification client 2 operate on computers. A user who operates the notification client 2 can make an inquiry to other users by sending a question to the notification server 1, and can obtain answers to the questions from others through the notification server 1. In addition, the user can register an answer into the notification server 1 in response to a question posted by another user.

In this notification system, a user can notify the notification server 1 that the user has interest in a question posted by another user. The notification server 1 sends the answers to the question to the notification client 2 for the user who has interest in the question at predetermined timing. The answers are thus sent automatically to a user/users who has/have a similar question to the question raised by the above questioner and want(s) to know the answer(s) thereto (hereinafter refereed to as "referring users"). The users on the network are thus able to quickly obtain the answers to a problem shared among them. In other words, it is possible for the users to quickly acquire and share necessary knowledge.

The notification server 1 determines at what timing the answer is to be sent to the referring users and which answer should be sent. It is conceivable that an answer or answers may be sent to the referring users, for example, when the answers have converged, or when an answer has attracted many responses, or when a new answer to the question has been posted. In the event that there are a plurality of answers to a question, it is possible to send an effective answer to the referring users, for example, by sending them the answer that has earned a high approval rate, or by sending them the answer that many users wished to save.

The notification of the answer(s) may be provided for a user/users (hereafter referred to as "expected referring users") who is/are expected to have common interest in a certain question, as well as for the referring users. For example, for a certain question, a collective user profile for the question is computed based on the user profiles of the referring users. This collective user profile represents personal information that is common to the users who have interest in the question. Based on the collective user profile, the notification server 1 extracts expected referring users from the user profiles that were stored in advance and notifies these users of a converged answer. Since the expected referring users are also notified of the question and the answer, it is possible to efficiently extend knowledge of the users on a network who require shared knowledge.

2 Notification Server

In this section, functions of the notification server 1 are detailed with reference to FIG. 1. The notification server 1 has databases 11 to 14 and modules 15 to 110.

2.1 Databases

Administration Database

Figure 2:
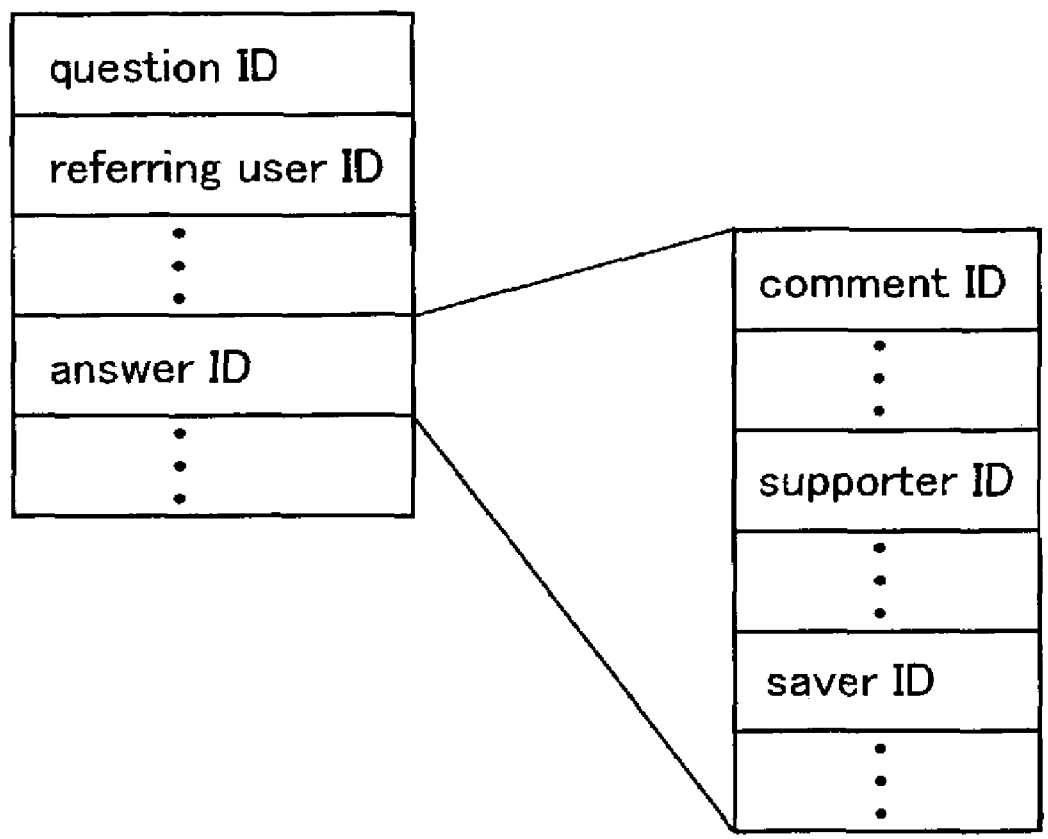
FIG. 2 illustrates the concept of information stored in an administration database.

FIG. 2 shows the concept of information stored in an administration database 11. The administration database 11 stores questions, answers to the questions, and comments on the answers. In addition to these, the information listed below, for example, is stored in one record. Thereby, questions, answers, and referring users are associated.

(a) question ID: the identifier that identifies the question from a user. For example, an address or a pointer that indicates the location in which the question is stored may be used for the question ID.

(b) referring user ID: the user ID for a referring user who has interest in a question identified by the foregoing question ID. The user ID is used to identify a notification client 2 on the notification system. One referring user ID or a plurality of referring user IDs is/are stored for one question ID. It should be noted that the questioner is included among the referring users.

(c) answer ID: the identifier that identifies the answer to the question that is identified by the foregoing question ID. As in the case of the question ID, an address or a pointer that indicates the location in which the answer is stored may be used for the answer ID. One answer ID or a plurality of answer IDs is/are stored for one question ID.

In addition, the following information is associated with one answer ID and is stored.

(d) comment ID: the identifier that identifies the comment on the question that is created by a given user. The ID may be an address or a pointer that indicates the location in which the comment is stored. One comment ID or a plurality of comment IDs is/are associated with one answer ID.

(e) supporter ID: the user ID that identifies the user who supports the answer identified by the foregoing answer ID (hereinafter referred to as a "supporter"). One supporter ID or a plurality of supporter IDs are associated with one answer ID.

(f) saver ID: the user ID that identifies the user who wishes to save the answer identified by the foregoing answer ID together with the question (hereinafter referred to as a "saver"). One saver ID or a plurality of saver IDs is/are stored for one answer ID.

User Profile Database

A user profile database 12 stores user profiles (not shown in the drawings) of the users who operate notification clients 2. For example, if the notification system is used within a corporation, the user profile may include such personal information as the section to which the user belongs, his/her job description, job title, office address, length of service, and so forth. When stored, the user profiles are associated with user IDs. User profiles may be constructed either in the notification system or in a system other than the notification system.

Collective User Profile Database

Figure 3:
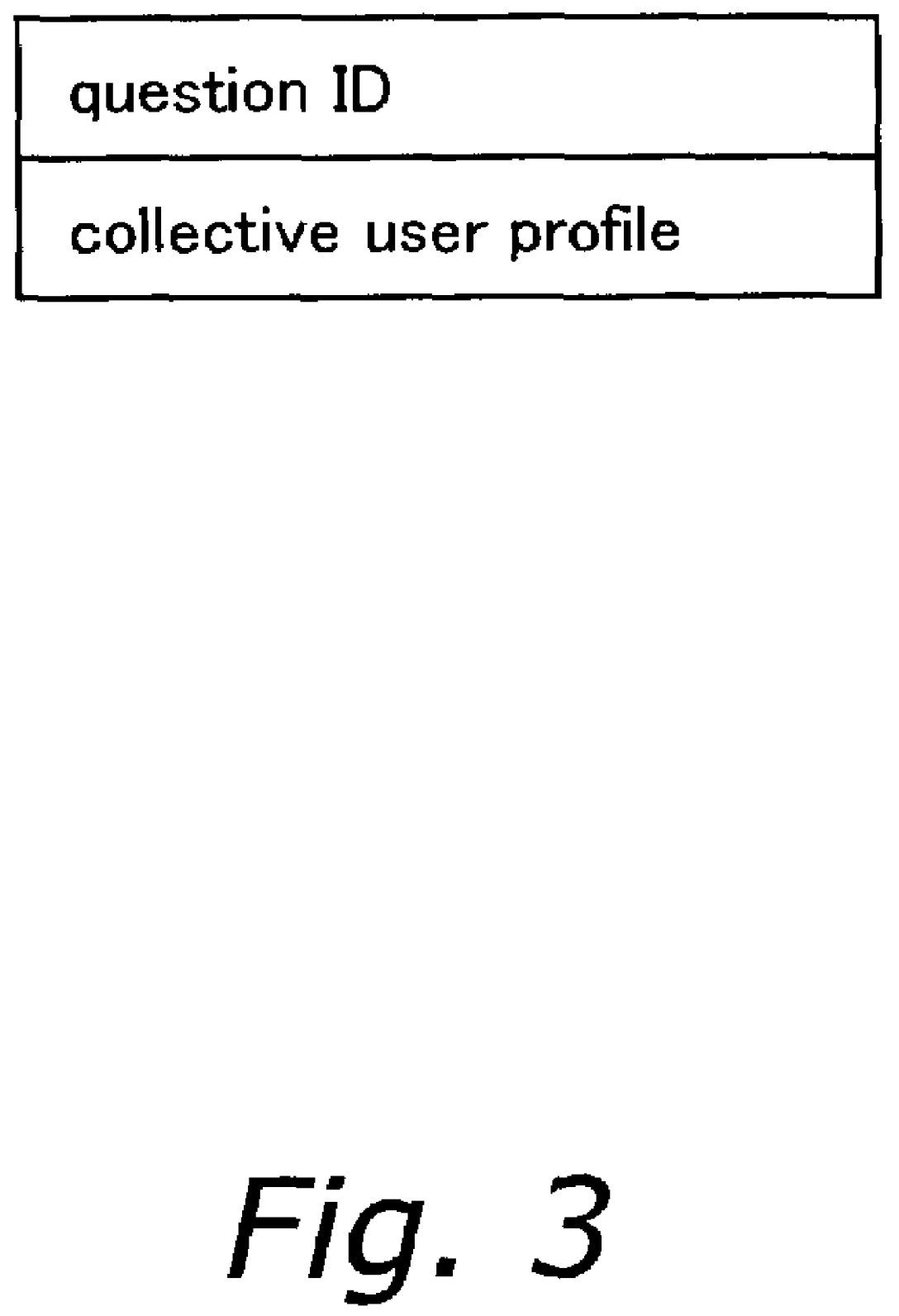

FIG. 3 shows the concept of information stored in a collective user profile database 13. In the collective user profile database 13, a question ID and a collective user profile are stored in one record. The collective user profile is computed based on the referring users to the question identified by a question ID. More specifically, the collective user profile represents personal information that is common to the referring users to a certain question.

Condition Database

Figure 4:
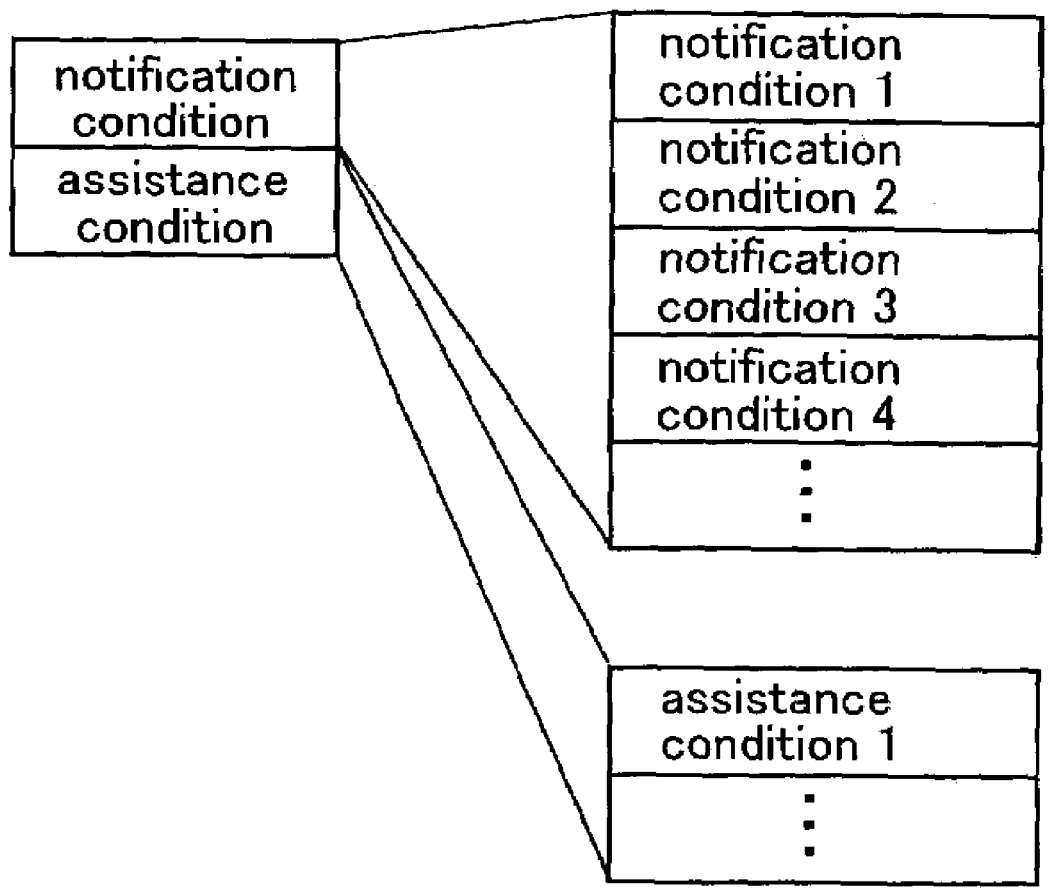
FIG. 4 illustrates the concept of information stored in a condition database.

FIG. 4 shows the concept of information stored in a condition database 14. The condition database 14 stores one or more notification conditions and one or more assistance conditions. The notification conditions are for determining timing at which an answer to a certain question is to be sent to the referring users. Examples of the notification conditions include a condition in which convergence conditions 1 to 3 for answers to converge are met, a condition in which the number of comments on an answer exceeds a predetermined number, or a condition in which a new answer is posted. More details of the convergence conditions and the notification conditions will be described later.

Assistance conditions are for determining when an administrator who administers the notification server 1 gives assistance for obtaining answers to a question. For example, assistance conditions are set so that the administrator gives assistance for obtaining answers when answers do not converge or when answers to a certain question diverge. Details of the assistance conditions will be described later.

2.2 Functions of Modules

In this section, functions of modules 15 to 110 incorporated in the notification server 1 are specifically described with examples. The modules 15 to 110 can be realized by a configuration including a software that performs processes which are based on web access, such as, CGI (Common Gateway Interface), SERVLET, JSP (Java Server Page), and ASP(Active Server Page). The modules 15 to 110 may include a software that can "push" information from the notification server 1 to notification client 2. Of course, it is possible that an application dedicated to the notification system is provided for the notification server 1 and/or the notification client 2 to attain the later-described functions.

Question Module

A question module 15 receives a question from the notification client 2 and stores the question. Then it provides the question to a given notification client 2. FIG. 5 shows examples of screens that the question module 15 offers to the notification client 2. First, a main menu screen is presented as illustrated by FIG. 5A, then a Q&A top page screen as in FIG. 5B, next a question list screen as in FIG. 5C, and subsequently a question detail screen as in FIG. 5D. The question detail screen displays a question stored in the administration database 11. It should be noted, however, that the sequential flow of the screens until the question detail screen is displayed is not limited to this example. For example, the question detail screen FIG. 5C may be displayed after a keyword search screen (not shown in the drawing).

Referring User Module

A referring user module 16 accepts a request from a referring user, which is then associated with the question and is stored. For example, the referring user module 16 displays the "Interested in developments of the thread" button at the top of the question detail screen shown in the above-mentioned FIG. 5D, and it accepts designation of the question that the user has interest in. When this button is pressed, the question ID and the user ID are transmitted from the notification client 2 to the notification server 1. The user ID is associated with the question ID and is stored as a referring user ID in the administration database 11. Thereafter, the referring user module 16 presents a result notification confirmation screen, as illustrated in FIG. 5E, to the notification client 2. Thus, the user who operates the notification client 2 can confirm that he/she has been recognized as a referring user.

Answer Module 17

Preparing and Viewing an Answer

As shown in FIG. 6D, an answer module 17 receives, in the question detail screen, an instruction for preparing an answer and an instruction for viewing an answer. For example, if the "Write answer proposal" button is pressed to give instruction for preparing an answer, an answer preparation screen as illustrated in FIG. 6E is presented. In this screen, an answer preparation is accepted. The answer that has been prepared is associated with the question and is stored into the administration database 11. In addition, the answer module 17 accepts a request for viewing an answer when the "View proposed answer" button is pressed on the question detail screen, then displaying an answer to the question that is displayed on the question detail screen (see FIG. 7E, the description of which will be given later).

Supporting an Answer

The answer module 17 also accepts support for an answer that has been prepared. FIG. 7E shows a proposed answer display screen presented for the notification client 2 by the answer module. If the button "Support" button, for example, is pressed on the screen, then a confirmation screen as shown in FIG. 7F is presented. Then, if the "OK" button is pressed in this screen to confirm support for the answer, then a support request is transmitted from notification client 2 to the notification server 1. This support request contains the user ID of the user who operates the notification client 2 and the answer ID of the answer that has attracted the support. The user ID, as a supporter ID, is associated with the answer ID and is stored in the administration database 11. Thus, it is possible to compute the number of supporters for each answer, the approval rate for each answer, and so forth; and it is possible to infer the effectiveness of each answer.

Saving the Question and the Answers

In addition, the answer module 17 accepts designation of the question and the answers that the user wishes to save as his/her own know-how (hereafter referred to as "saving request") from the notification client 2. For example, as shown in FIG. 8E, a saving request is accepted when the "Save this proposed answer handy" button is pressed on the proposed answer display screen. In response to the saving request, the user ID, the question ID, and the answer ID are transmitted to the notification server 1, in which the user ID, as a saver ID, is associated with the answer ID and is stored into the administration database 11. As illustrated in FIG. 8F, a save confirmation screen may be presented after the saving request has been made, and the user ID, the question ID, and the answer ID may be transmitted to notification server 1 after the user's intention to save the proposed answer is confirmed. The user can store as his/her own know-how the question and the answers thereto which are considered useful for him/her.

Viewing the Saved Questions and Answers

The answer module 17 provides the saved question and answers to the notification client 2. When the notification client 2 that has saved the question and answers accesses the notification server 1, the answer module 17 indicates on the main menu screen, for example, that the user's know-how is saved. In the example shown in FIG. 8G, the "My know-how" button is displayed. By pressing this button, a question and answer pair is displayed that corresponds to the notification client 2. If there are a plurality of question and answer pairs, a list of those pairs may be displayed as exemplarily illustrated in FIG. 8H, to allow the user to make a selection therefrom. The question and answers that are selected on the list screen are displayed on a detailed know-how screen as exemplarily illustrated in FIG. 8I. Thus, the referring user can easily refer to the questions and answers that have been stored as his/her own "know-how".

Adding and Referring Comments

The answer module 17 accepts addition of a comment on an answer and a referral request to a comment from the notification client 2. For example, as illustrated in FIG. 9E, the answer module 17 provides the "Add comment" button in the proposed answer display screen for the notification client 2. If this button is pressed, a comment preparation screen is presented as exemplarily illustrated in FIG. 9F to accept comment preparation. If the "OK" button is pressed after the comment preparation, the comment is transmitted to the notification server 1, where the comment is associated with the answer and is stored in the administration database 11. Thus, a given user can make comments on the answers to a certain question, such as supplementary remarks about the answers or corrections to the answers.

Figure 9H:
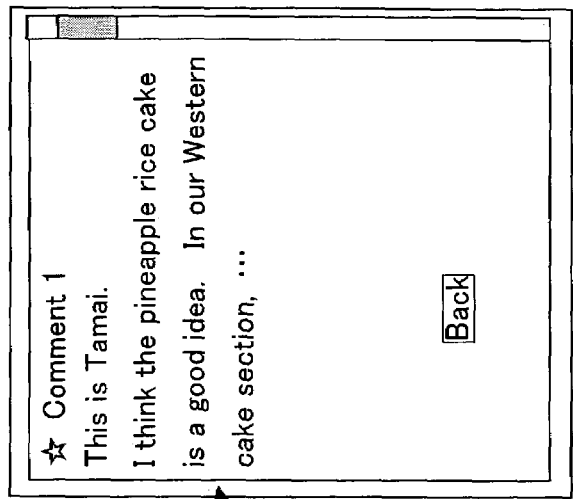
FIG. 9H shows an example a comment display screen provided by the notification server.
Figure 9G:
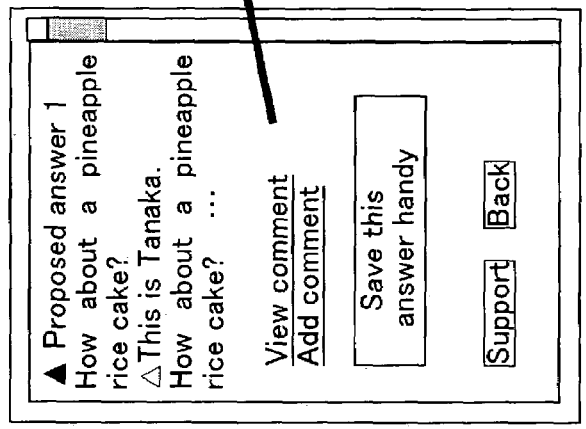
FIG. 9G shows an example a proposed answer display screen provided by the notification server.
Figure 9F:
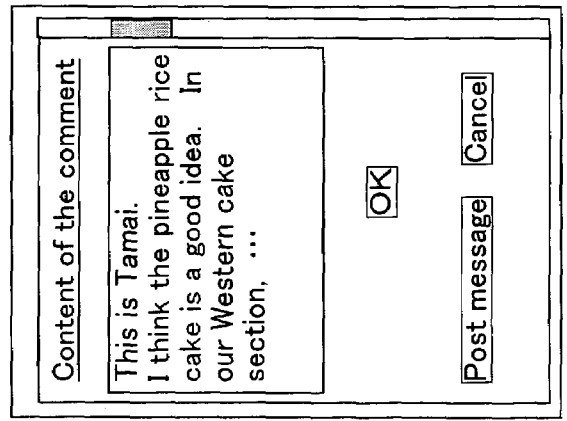
FIG. 9F shows an example a comment preparation screen provided by the notification server.

On the other hand, in order to accept a referral request to a comment, the answer module 17 indicates, as illustrated in FIG. 9G, the "View comment" button on the proposed answer display screen (see FIG. 9G). If the "View comment" button is pressed on this screen, a comment display screen as shown in FIG. 9H is presented, on which a comment related to the answer is displayed. When there are a plurality of comments on the answer, it is possible that the comments may be displayed one after another by, for example, pressing the "Next" button (not shown in the drawing). Thus, a given user can view the comments that are made on the answers to a certain question.

Answer Notification Module

An answer notification module 18 notifies a referring user of an answer (hereinafter this process is simply referred to as "answer notification"). It is possible that a referring user be notified of all the answers designated by the referring user, but it is preferable that effective answers be selectively sent to the referring user. Conceivable examples of effective answers include those with high approval rates, those with large numbers of supporters, and those attracted more than a predetermined number of comments. The answer notification is transmitted from the notification server 1 to the notification client 2 using a "push" system.

FIG. 10 shows examples of screens that the answer notification module 18 offers to the notification client 2. When the answer notification module 18 determines that it notifies a referring user of an answer, it indicates on the main menu screen, for example, that an effective answer is offered to the question. It also accepts an answer referral request on this screen. In the example illustrated in FIG. 10A, the answer notification module 18 accepts an answer referral request if the "The question 'What's next to strawberry rice cake?' got an effective answer!" button is pressed, and it offers a question detail screen (see FIG. 10B). It is not essential, but is preferable, to display this screen since the referring user can be reminded of the question that he has had interest in. The question detail screen shows, for example, the "To proposed answer" button, and an instruction to display a proposed answer is accepted when this button is pressed. Then, the question and the answer are displayed on the proposed answer display screen as shown in FIG. 10C. Thus, the referring user can be automatically notified of an answer to the question that he/she has interest in.

Figure 10C:
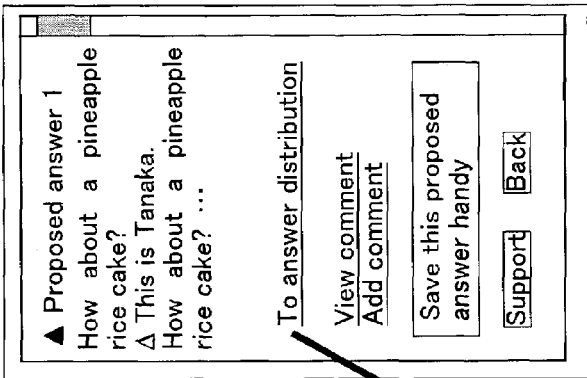
FIG. 10C shows an example of a proposed answer display screen provided by the notification server.
Figure 10B:
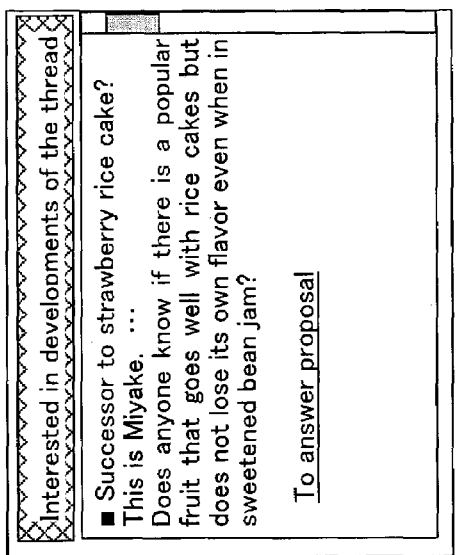
FIG. 10B shows an example of a question detail screen provided by the notification server.
Figure 10A:
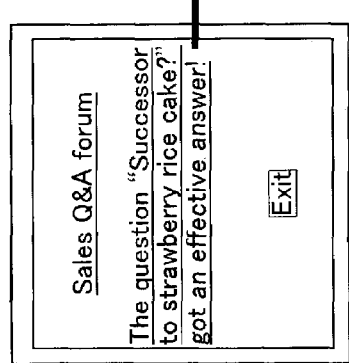
FIG. 10A shows an example of a main menu screen provided by the notification server.
Figure 10D:
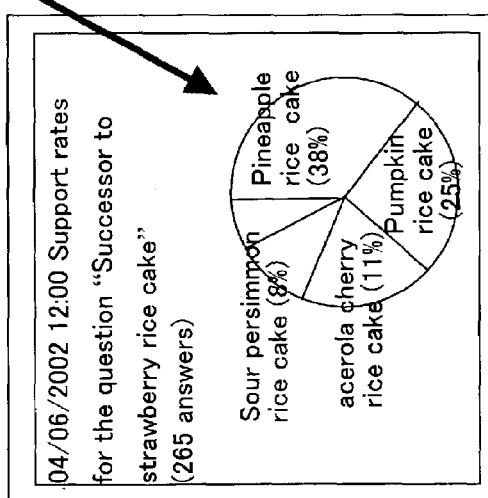
FIG. 10D shows an example of an answer distribution screen provided by the notification server.

Moreover, the answer notification module 18 may offer the effectiveness of the answer displayed on the proposed answer display screen to the notification client 2. For example, it is possible that an answer distribution screen as illustrated in FIG. 10D, in which approval rates for the answers are shown, may be presented by pressing the "To answer distribution" button on the proposed answer display screen. Thus, the referring user can estimate the effectiveness of the answer that has been sent.

The timing for the answer notification is not particularly limited. Conceivable examples thereof include when answers to the question converge, when a new answer is posted, and when the number of comments on a certain answer exceeded a predetermined number. Further, in addition to the referring users, the answer may be sent to the expected referring users who are extracted from the user profile database 12 based on the collective user profile. If the numbers of referring users and expected referring users are large, it is possible that all the users may be notified of the question and the answer.

Condition Module

A condition module 19 receives settings for the notification conditions, which are for determining timing of the answer notification, and settings for the convergence conditions, which are for determining whether answers have converged or not, from the administrator of the notification server 1. Here, the expression "answers have converged" is intended to mean a state in which it may be regarded that an answer has been offered that a plurality of users who refer to a certain question generally approve, and this is achieved by the administrator setting a condition for the convergence. FIG. 11 shows examples of screens displayed on the notification server 1 by the condition module 19. For example, identification information such as IDs and passwords is received on an administrative starting screen as shown in FIG. 11A. Next, an administrative main menu screen as shown in FIG. 11B is displayed, and then settings for the convergence conditions are received on a convergence condition-setting screen as shown in FIG. 11C. In this example, three convergence conditions are set.

Convergence condition 1: When the number of supporters is 30 or greater and the approval rate is 40% or higher.

Convergence condition 2: When one question and answer pair is saved by 20 people or more.

Convergence condition 3: When no new answer has been offered for 7 days or longer after an answer was offered by a user having proven track record. Here, the term "the user having proven track record" is intended to mean, for example, such a user who has offered 5 or more answers that were regarded effective among all the answers he/she has posted.

FIG. 11D shows an example of a notification condition-setting screen displayed by the condition module 19. In this example, three notification conditions are set.

Notification condition 1: When answers have converged according to any of the foregoing convergence conditions 1 to 3.

Notification condition 2: When an answer has attracted a predetermined number or more of comments.

Notification condition 3: When a new answer has been posted to the question.

Based on the convergence conditions and notification conditions thus set, the answer notification module 18 determines whether or not answers have converged, and timing of answer notification. It should be noted that the convergence conditions and the notification conditions listed above are merely illustrative examples and they are not meant to be restrictive.

Assisting Module

An assisting module 110 receives settings of assistance conditions for determining when the administrator of the notification server 1 should assist services on the notification system, and it requests the administrator to give assistance. FIG. 12 shows an example of an assistance condition-setting screen offered by the assisting module 110. In this example, two assistance conditions are set.

Assistance condition 1: When answers do not converge even after a certain amount of time has elapsed after the posting of a question.

Assistance condition 2: When too many answers have been offered. For example, 4 or more answers have been offered.

Based on assistance conditions received on the assistance condition-setting screen, the assisting module 110 determines whether or not the assistance conditions are satisfied for each question ID. This determination is executed at a predetermined time interval, for example. When the assistance conditions are satisfied, assistance notification is carried out to request the administrator to give assistance.

FIG. 13 shows examples of assistance notification screens displayed on the notification server 1 by the assisting module 110. For example, authentication processing is carried out on an administrative starting screen as shown in FIG. 13A, and thereafter, assistance is requested on an administrative main menu screen as shown in the FIG. 13B. Also on this screen, a referral request for more detailed information is received. When a referral to detailed information is requested, content of the question and answer state are sent on a detailed notification screen as shown in FIG. 13C. For example, the example shown in FIG. 13C shows that no answer has been offered to the question, and the example shown in FIG. 14C shows that no effective answer has been offered, although some answers were presented.

3 Notification Client

Referring to FIG. 1 again, the notification client 2 is detailed below. The notification client 2 has an information transmitting and receiving module 21 for transmitting and receiving information with the notification server 1. The information transmitting and receiving module 21 has a function for receiving information from the notification server 1 using a push-system. For example, when the notification server 1 is constructed by a configuration containing CGI, SERVLET, JSP, ASP, or the like, the information transmitting and receiving module 21 can be realized using a web browser. In this case, it is impossible to send ("push") information by the notification server 1, and for this reason, information notification by an operation initiated by the notification server needs to be realized using a pseudo means or an alternative protocol.

4 Process Flow

In this section, flows of the primary processes performed by the notification server 1 are described.

4.1 Main Process

Figure 15:
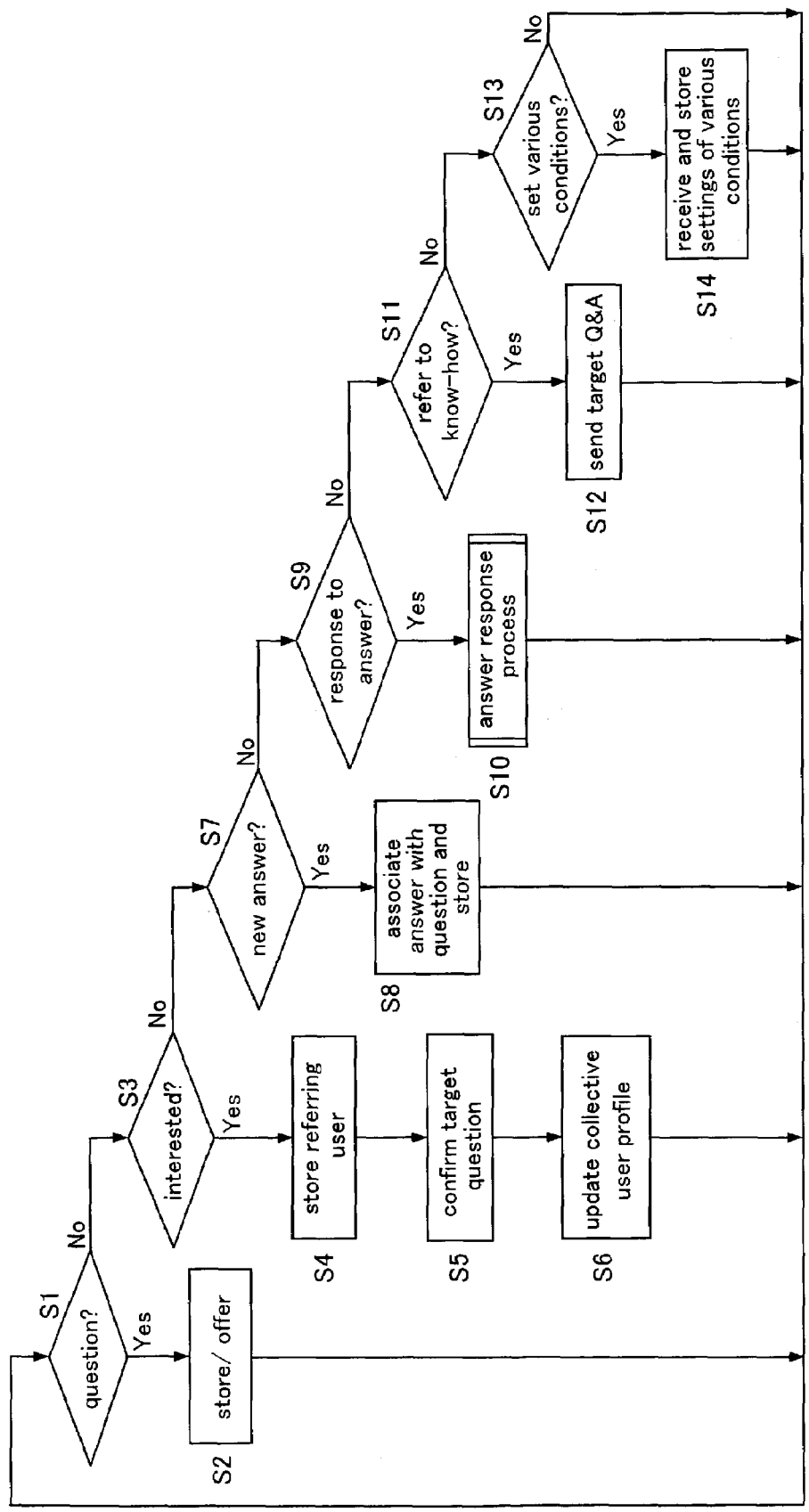
FIG. 15 is a flow-chart showing an example of the flow of a main processing.

FIG. 15 is a flow-chart showing the flow of a main process.

Steps S1 and S2: The notification server 1 receives a request for preparing a question or viewing a question from the notification client 2 (S1), and it stores the question posted by the client 2 into the administration database 11 or offers the requested question among the questions stored in the administration database 11 to the client 2 (S2).

Steps S3, S4, S5, and S6: The notification server 1 acquires the question ID of the question that a user has interest in and the user ID of the user from the notification client 2 (S3). Next, the notification server 1 associates the acquired user ID as a referring user ID with the question ID, and stores therein (S4). Then, the notification server 1 confirms the question that is the target of the user's interest with the notification client 2 of the referring user (S5). Subsequently, the notification server 1 updates the collective user profile for the question based on the user profile of the referring user (S6).

Steps S7 and S8: When the notification server 1 receives a new answer to a given question from the notification client 2 (S7), it associates the answer with the question and stores them in the administration database 11 (S8).

Steps S9 and S10: When the notification server 1 receives a response to an existing answer from the notification client 2 (S9), it executes the later-described answer response process (S10). Here, the response to an answer may be a support to the answer, a saving request thereof, addition of comments, and a referral request to a comment.

Steps S11 and S12: The notification server 1 receives a referral request to the stored question and answer from the notification client 2 (S11), and it offers the notification client 2 the question and answer that correspond to the notification client 2 (S12).

Steps S13 and S14: The notification server 1 receives settings of the convergence conditions and the notification conditions (S13), and it stores the set convergence conditions and notification conditions into the condition database 14 (S14).

4.2 Answer Response Process

Figure 16:
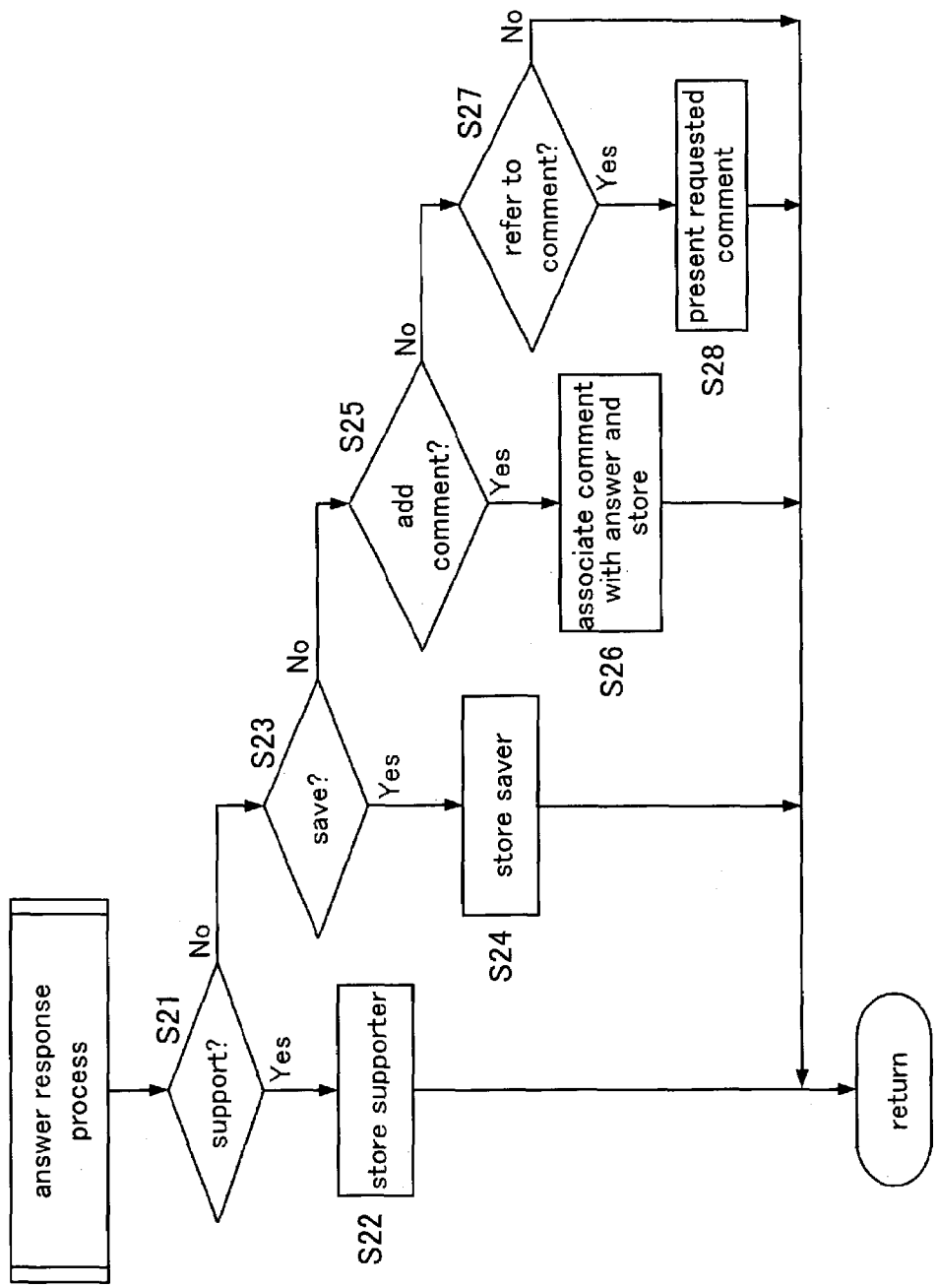
FIG. 16 is a flow-chart showing an example of the flow of answer response processing.

FIG. 16 is a flow-chart showing an example of the flow of answer response process. This process is executed when the foregoing main process enters step S10.

Steps S21 and S22: When the notification server 1 receives a support to an answer (S21), it associates the user ID of the supporter, serving as a supporter ID, with the answer ID and stores them into the administration database 11 (S22).

Steps S23 and S24: When the notification server 1 receives a saving request for an answer (S23), it associates the saver ID with the answer ID and stores them into the administration database 11 (S24).

Steps S25 and S26: When the notification server 1 receives a request for adding a comment from the notification client 2 (S25), it receives posting of a comment, associates the posted comment with the answer, and stores them into the administration database 11 (S26).

Steps S27 and S28: When the notification server 1 receives a comment referral request from the notification client 2 (S27), it read out the requested comment from the administration database 11 and offers it to the notification client 2 that made the request (S28).

4.3 Answer Notification Process

Figure 17:
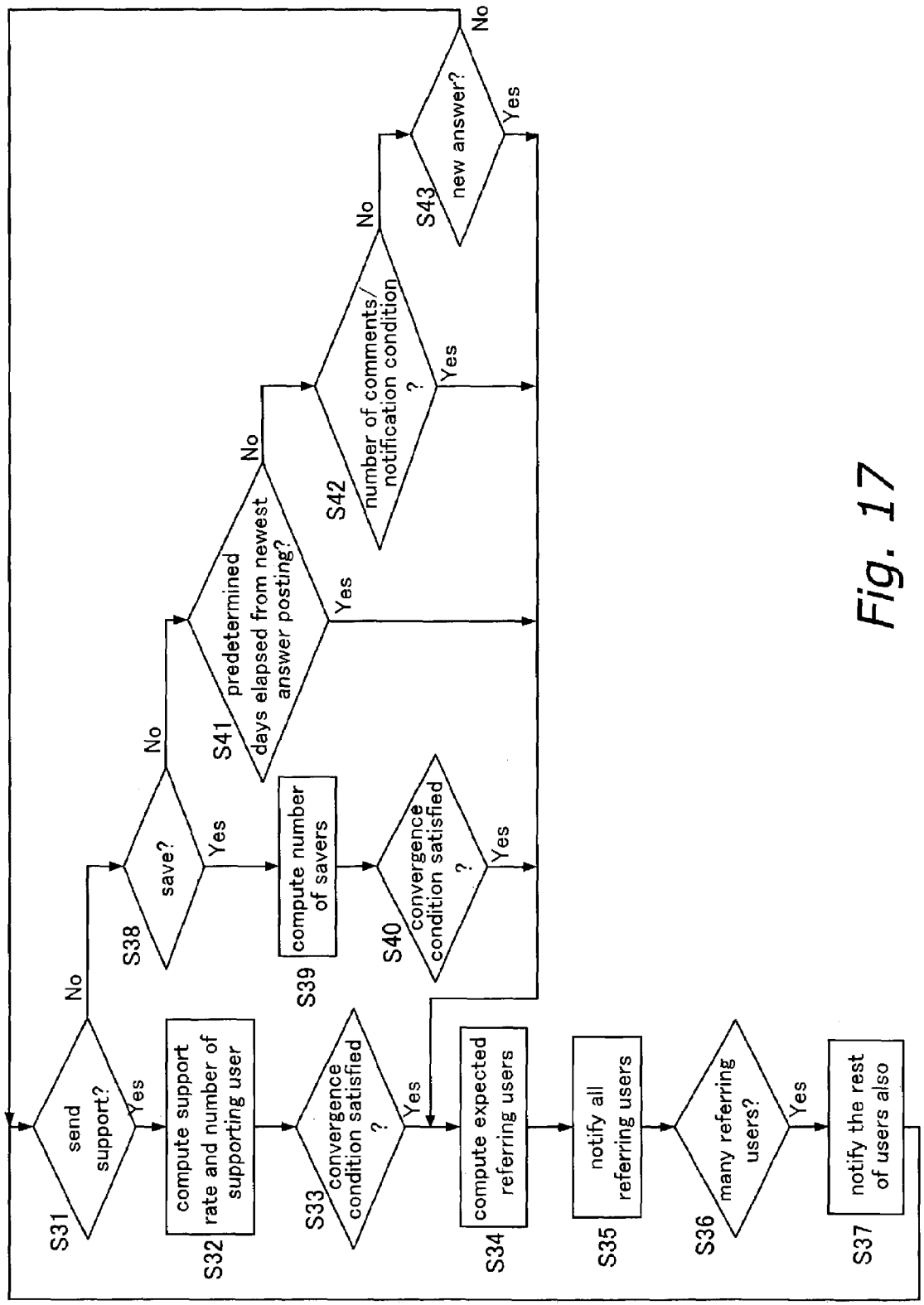
FIG. 17 is a flow-chart showing an example of the flow of answer notification processing.

FIG. 17 is a flow-chart showing the flow of an answer notification process carried out independently of the main process by the notification server 1. For the sake of brevity in illustration, it is assumed here that the notification conditions and the convergence conditions are set as shown in the foregoing FIG. 11.

Steps S31, S32, S33, S34, and S35: When receiving a support to a certain question from the notification client 2 (S31), the notification server 1 computes the approval rates and the number of supporters for the answers to the question (S32). Next, the notification server 1 determines whether the approval rates and the numbers of supporters satisfy the foregoing convergence condition 1 (S33), and if the convergence condition is satisfied, it computes expected referring users (S34). Then, it notifies the referring users and the expected referring users of the answer. The answer to be sent may be, for example, the answer having the highest approval rate.

Steps S36 and S37: The notification server 1 determines whether or not there are many referring users and expected referring users. This can be determined, for example, by judging whether the percentage of the total number of the referring users and the expected referring users is greater than a predetermined percentage of all the users. When there are many such users, the rest of the users is also notified of the question and answer (S37).

Steps S38, S39, and S40: When the notification server 1 receives a saving request from the notification client 2 (S38), it computes the number of savers for the answer (S39). If the number of savers satisfies the foregoing convergence condition 2 (S40), the process of the foregoing steps S34 to S37 is repeated. It should be noted that the answer to be sent is the one that satisfies convergence condition 2.

Step S41: The notification server 1 determines whether the newest effective answer to a question was posted 7 days before or earlier, and if the decision is "yes", then the server sends the notification client 2 the existing answers according to the foregoing steps S34 to S37.

Step S42: The notification server 1 determines whether there is an answer that has attracted a predetermined number of comments, the number being specified by the foregoing notification condition 2, and if the decision is "yes", then the server sends the answer to the referring users according to steps S34 to S37.

Step S43: When the notification server 1 receives a newly posted answer from the notification client 2, the server sends the answer to the referring users according to the foregoing steps S34 to S37. This corresponds to the case where the foregoing notification condition 3 is satisfied.

Other Embodiments (A) It is possible to automatically generate a FAQ by registering a question and answer pair for the FAQ when there are a large number of users who have saved a certain question and a certain answer thereto. If the FAQ is published, users can efficiently find and make use of useful information.

(B) When there are two referring users a and b who have interest in a question Q1, the referring user a may be notified of other questions Q2, Q3, . . . that the referring user b is interested in. Likewise, the referring user b may be notified of other questions Q4, Q5, . . . that the referring user a is interested in. Thus, it is possible to notify a user of questions that are likely to be related to the questions that the user is interested in.

(C) It should be noted that the present invention encompasses a recording medium which stores a program for executing the above-described method of the invention. Examples of recording media that are usable for this purpose include computer readable recording media such as flexible disks, harddisks, semiconductor memories, CD-ROMs, DVDs, magneto-optical disks (MO), and so forth.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A method of notification by which questions and answers are exchanged between users, comprising:
   a question-processing step of receiving registration of a question from a questioner who is included among the users, and publishing the registered question;
   an answer-processing step of receiving registration of one or more answers to the question from one or more respondents who are included among the users, and publishing the registered answer(s);
   a designation-receiving step of receiving, from one or more referring users who are included among the users but are not the respondent(s), designation of a question that is among the published question(s) and that the referring user(s) has interest in; and
   an answer notification step of notifying the referring user(s) of the one or more answers to the designated question.

2. The method of notification as set forth in claim 1, wherein, in the answer-processing step, a support to one of the answers is received from a user who is not one of the respondents.

3. The method of notification as set forth in claim 1, wherein the answer-processing step comprises:
   a sub-step of receiving a saving request for the question and the answer(s) to the question from the referring user(s), and saving an association of the question, the answer(s), and the referring user(s); and
   a sub-step of offering the saved question and answer in response to a request from the referring user(s).

4. The method of notification as set forth in claim 1, wherein the answer-processing step comprises a sub-step of receiving registration of a comment/comments from a user/users, and publishing the registered comment(s).

5. The method of notification as set forth in claim 1, wherein, in the answer notification step, effectiveness of the answer(s) to the question is determined and the referring user(s) is/are notified of an answer/answers having high effectiveness.

6. The method of notification as set forth in claim 1, wherein, in the answer notification step, it is decided whether an answer notification condition, which is a condition for notifying the referring user(s) of the answer(s), is satisfied or not, and the answer(s) is/are sent to the referring user(s) according to the result of the decision.

7. The method of notification as set forth in claim 1, further comprising:
   a personal information-storing step of storing personal information of the users;
   wherein, in the answer notification step, personal information of some of the users is extracted from the stored personal information based on personal information of the referring user(s), and the owner(s) of the extracted personal information is/are notified of the answer(s).

8. The method of notification as set forth in claim 1, further comprising an assisting step of deciding whether or not an answer assistance condition, which is for determining when the answer(s) cannot be sent to the referring user(s), is satisfied, and outputting an answer assistance request according to the result of the decision.

9. The method of notification as set forth in claim 1, further comprising a notification condition-setting step of receiving a setting of an answer notification condition, which is for determining when to notify the referring user(s) of the answer(s).

10. The method of notification as set forth in claim 1, further comprising a convergence condition-setting step of receiving a setting of an answer convergence condition, which is for determining whether answers to the question have converged.

11. The method of notification as set forth in claim 1, further comprising an assistance condition-setting step of receiving a setting of an answer assistance condition, which is for determining when the answer(s) cannot be sent to the referring user(s).

12. A computer-readable storage medium storing a notification program for exchanging questions and answers between users and for executing:
   a question-processing step of receiving registration of a question from a questioner who is included among the users, and publishing the registered question;
   an answer-processing step of receiving registration of one or more answers to the question from one or more respondents who are included among the users, and publishing the registered answer(s);
   a designation-receiving step of receiving, from one or more referring users who are included among the users but are not the respondent(s), designation of a question that is among the published question(s) and that the referring user(s) has interest in; and
   an answer notification step of notifying the referring user(s) of the one or more answers to the designated question.

13. A notification device for exchanging questions and answers between users, comprising:
   a question-processing means for receiving registration of a question from a questioner who is included among the users, and publishing the registered question;
   an answer processing means for receiving registration of one or more answers to the question from one or more respondents who are included among the users, and publishing the registered answer(s);
   a designation-receiving means for receiving, from one or more referring users who are included among the users but are not the respondent(s), designation of a question that is among the published question(s) and that the referring user(s) has interest in; and
   an answer notification means for notifying the referring user(s) of the one or more answers to the designated question.

14. A notification program for exchanging questions and answers between users and for making a computer function as:
   a question-processing means for receiving registration of a question from a questioner who is included among the users, and publishing the registered question;
   an answer processing means for receiving registration of one or more answers to the question from one or more respondents who are included among the users, and publishing the registered answer(s);

a designation-receiving means for receiving, from one or more referring users who are included among the users but are not the respondent(s), designation of a question that is among the published question(s) and that the referring user(s) has interest in; and an answer notification means for notifying the referring user(s) of the one or more answers to the designated question.

* * * * *